United States Patent
Hernandez et al.

(10) Patent No.: US 7,653,252 B2
(45) Date of Patent: Jan. 26, 2010

(54) METHOD AND APPARATUS FOR BOUNDARY-BASED IMAGE COMPRESSION

(75) Inventors: Albert A Hernandez, Tustin, CA (US); Gregory Cooper, Santa Ana, CA (US); Bernadette M. Baclig, Fullerton, CA (US); Laszlo R. Gasztonyi, Fairfax Station, VA (US); George P. Mulopulos, Las Vegas, NV (US)

(73) Assignee: Compressus, Inc., Washington, DC (US)

( * ) Notice: Subject to any disclaimer, the term of this patent is extended or adjusted under 35 U.S.C. 154(b) by 780 days.

(21) Appl. No.: 11/233,777

(22) Filed: Sep. 22, 2005

(65) Prior Publication Data

US 2007/0065032 A1   Mar. 22, 2007

(51) Int. Cl.
G06K 9/36 (2006.01)
G06K 9/00 (2006.01)
(52) U.S. Cl. .................. 382/232; 382/128; 382/239
(58) Field of Classification Search .......... 382/128, 382/131–132, 232, 233, 239, 305; 600/300
See application file for complete search history.

(56) References Cited

U.S. PATENT DOCUMENTS 5,204,920 A    4/1993 Moran et al. ............. 382/166
5,384,643 A    1/1995 Inga et al. ............... 358/403
5,553,160 A *  9/1996 Dawson ................... 382/166
6,832,001 B1 * 12/2004 Kashiwagi ................ 382/166

* cited by examiner

Primary Examiner—Duy M Dang
(74) Attorney, Agent, or Firm—The Marbury Law Group PLLC (57) ABSTRACT

Compressing a data file representing an image wherein one or more regions within the image are identified. At least one of the regions is selected and the data corresponding to the selected region is compressed at a different rate that the data corresponding to non-selected regions of the image. The different compression rates are selected to maintain a desired fidelity in an image reconstructed from the compressed data file. The different compression rates can be predetermined, selected by a user, or automatically selected. Compression rates can be based upon the type of image to be compressed such as x-ray, CT scan or MRI images, the structure that is being analyzed, parameters regarding the use of the image, system parameters such as storage capacity available, or bandwidth of a communication channel used to transmit the compressed file.

33 Claims, 5 Drawing Sheets

METHOD AND APPARATUS FOR BOUNDARY-BASED IMAGE COMPRESSION

CROSS REFERENCE TO RELATED APPLICATIONS

This application is related to co-pending U.S. patent application entitled "Event Notification Verification And Escalation", U.S. patent application entitled "Method and Apparatus for Adjustable Image Compression", and U.S. patent application entitled "Autonomous Routing of Network Messages", all of which are being filed concurrently with the present application and are hereby incorporated by reference.

BACKGROUND OF THE INVENTION

1. Field of the Invention

This invention relates generally to image compression and, more particularly, to differential image compression.

2. Description of the Related Art

Transmission and handling of message data is an important function that must be carefully and efficiently performed. For example, a health care delivery system such as a hospital or medical center will receive message data of many different types. It is critical for the health of patients that message data are delivered to appropriate medical staff, with sufficient data integrity to be useful to the staff member. Message data may include image information, for example, image information from a laboratory examination such as an X-ray, CT Scan, or other medical examination procedure. The image information can be in a variety of data formats, such as JPEG formatted data, bitmap formatted data, TIFF formatted images, and the like including Raster formatted.

Representation of image information usually requires large amounts of data, making transmission and storage of image data challenging and expensive. Data compression is a useful tool for storing and transmitting large amounts of data. Data compression refers to techniques that represent data in a fashion that requires less "bits" then the original data to represent. Data compression is very useful in the storage of data because less storage space is required to store the data file. It is also very useful in transmission of the data file because fewer bits need to be transmitted to transfer the entire data file, therefore transferring more quickly and with less bandwidth.

In general, data compression techniques are divided into two broad categories, lossy compression and lossless compression. Lossy compression involves compression of a data file that results in the loss of some of the original information when the original data file is reconstructed from the compressed file. In other words, when the original data file is reconstructed from the lossy compressed file, there are differences, or errors, between the reconstructed file and the original file. A typical goal of lossy compression techniques is that the differences, or errors, in the reconstructed data file are not objectionable or detectable to the human visual response system.

Lossless compression involves compression of a data file that results in no loss of original information when the original data file is reconstructed. In other words, lossless compression techniques compress the original data file in such a way that when the data file is reconstructed from the compressed file there are no differences, or errors, between the reconstructed file and the original file.

Generally, lossy compression techniques can achieve a higher compression ratio, resulting in smaller compressed file sizes, as compared with lossless compression. A tradeoff is that there is degradation in the reconstructed data file using lossy compression while there is no degradation in the reconstructed data file using lossless compression.

Use of data compression techniques on medical image files can be beneficial in reducing both the storage and transmission of large image files. For example, digital radiology benefits from compression algorithms by reducing both storage and transmission cost of images. However, the amount of compression that can be achieved is limited by the amount of "loss" or errors, if any, that are acceptable in the reconstructed image, i.e., there may be resolution or loss specifications set by the application for the data. Because medical imagery may be critical for the health of patients it is very important to maintain the image "quality" which means that generally less compression can be tolerated and thus there is less efficient storage and transmission of the image data.

From the discussion above, it should be apparent that there is a need for a system and techniques that can improve data compression of image data files for reduced consumption of system resources while maintaining sufficient data fidelity. The present invention fulfills this need. Other problems with the prior art not described above can also be overcome using the teachings of the present invention, as would be readily apparent to one of ordinary skill in the art after reading this disclosure.

SUMMARY

In accordance with embodiments of the invention, advanced techniques are described for detection of ailments such as cancer, tumors, organ damage, and the like. Such techniques include computer aided diagnostics (CAD) in which a software program scans an image that may indicate a disease or ailment. The image may be compressed using techniques described herein that also help in the case of CAD. In accordance with embodiments of the invention, techniques are described for processing a data file containing data that represents, but is not limited to, a visual image, such that one or more regions within the visual image that correspond to depicted structures in the visual image are identified, at least one of the regions is selected, and a first compression rate is selected for data corresponding to the selected regions and data corresponding to unselected regions of the image are compressed at a different rate. The visual images can comprise medical imagery such as x-ray, computer tomography (CT scan), magnetic resonance imaging (MRI), or other types of images. For such images, the regions identified within the visual image can correspond to anatomical structures. The different compression rates are selected to maintain a desired fidelity in a reconstructed image, such as a region or structure of interest in the original visual image that is reconstructed from the compressed data file. In this way, data compression for an image is performed efficiently for reduced consumption of system resources, while maintaining data fidelity.

The different compression rates can be predetermined, selected by a user, or automatically selected. Compression rates can be based upon the type of image to be compressed, the structure that is being analyzed, parameters regarding the use of the image, system parameters, as well as others. For example, the types of images can include x-ray, CT scan, MRI, and the like. The structures being analyzed can be any structure depicted within the image, such as any anatomical structure. Parameters regarding use of the image can include, for example, the type of diagnosis for which an image reconstructed from the compressed data file will be used. For example, if the image relates to a bone and the reconstructed image will be used to identify a hairline fracture or a complete fracture of the bone, then the regions of the image that correspond to the bone can be compressed at lower rates of compression than other regions of the image that are not so relevant to the analysis. System parameters can take into account any constraint imposed by the operating environment. For example, the storage capacity available to store the compressed data files, or bandwidth of a communication channel used to transmit the compressed data files, can be used to adjust the compression ratio.

Other features and advantages of the present invention should be apparent from the following description of the exemplary embodiments, which illustrate, by way of example, the principles of the invention.

DETAILED DESCRIPTION

The present invention can be used for processing of image files related to medical diagnosis and the life sciences, where image fidelity is important. Imagery is a valuable tool in medical diagnosis and treatment. For example, radiology is a medical field that has made extensive use of film images for years. More recently digital technology has been applied to radiology imagery including digital captured images and digital conversions of film images. Digital radiology allows for the storage and transmission of digital data file representations of radiology images. While digital data files have features that are superior to film imagery, in particular when storing or transmitting images, a drawback is that high fidelity digital representation of radiology images results in data files that are large, requiring large amounts of data storage and communication channels with high bandwidth for transmission.

Conventional data compression techniques have been applied to the radiology image data files with limited success. With such conventional data compression techniques, the image data files are regarded as homogenous data files having binary digits that are suitable for data compression techniques that reduce the overall size of the data files. After a data file is compressed, the smaller size file is easier to send and receive and store over a computer network. The compressed file can be subjected to a data "reverse-compression" decompressive operation to restore the original image, as best as can be achieved under the circumstances. The reverse compression operation, also referred to herein as reconstruction of the original image, involves creating a visual image from the compressed data, with as little loss of viewing fidelity as possible. While conventional data compression techniques may result in smaller data file size overall, they can also result in unacceptable loss of fidelity (details) in the reconstructed image. This loss in fidelity can result in the reconstructed image being of limited use to a radiologist or other health care professional. Techniques are described herein that process visual image data files to produce compressed data files that are of reduced size when compared to the original data files, while maintaining adequate fidelity of the reconstructed image.

Figure 1:
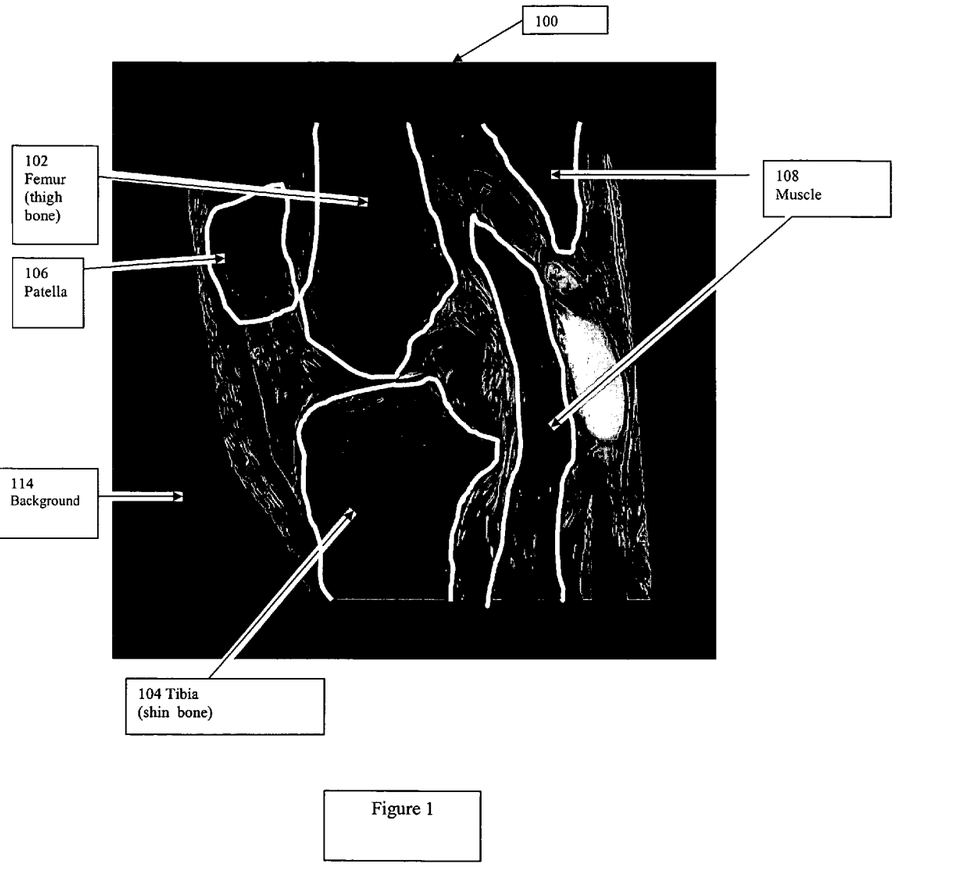
FIG. 1 is an illustration of an MRI image of a knee.

FIG. 1 is an illustration of an MRI image of a patella. The visual image 100 depicted in FIG. 1 shows several anatomical structures that can be identified. As shown in FIG. 1, the image 100 can be divided, or segmented, into different structures or bounded regions. The different regions can then be compressed at different compression rates. Compression rates will be referred to interchangeably herein with compression ratios. Depending on the intended use of the image 100, one region of the image may be of particular interest, and therefore it may be desired to use a relatively lower compression rate for that region, resulting in lossless compression of that particular region, whereas other regions of the image 100 may not be of as much interest and can therefore be compressed at a higher rate, even if the higher compression rate results in lossy compression and loss of fidelity in the reconstructed visual image.

In FIG. 1, the image 100 has a first region 102 corresponding to the femur, or thigh bone, a second region 104 corresponding to the tibia, or shin bone, and a third bounded region 106 corresponding to the knee cap. In addition there is a bounded region 108 of the image corresponding to the quadriceps, or thigh muscle, and another region 110 corresponding to cartilage. In addition to these regions that depict known anatomical structures, there are two regions 112 and 114 of the image background where there is little if any useful radiology data of interest present, and there is no identifiable anatomical structure of interest. The identification of these regions is referred to as segmentation of the image. The segmentation can be performed automatically upon viewing the image, or segmentation can be manually initiated by the user, as desired. After the image 100 has been segmented, whereby the various regions, or structures 102-114, in the image have been identified and their corresponding location within the image determined, different compression rates can be applied to each region.

A mask, or mapping, of the regions 102-114 can be developed as part of the segmentation process. Those skilled in the art of image processing will be familiar with image segmentation techniques. The techniques described herein are exemplary techniques that are suitable for the illustrated embodiments. In general, an image mask is generated by processing a data file corresponding to a visual image on a pixel-by-pixel basis. Thus, the visual image to be processed as described herein is a pixel-by-pixel mapping of image values. The pixel values can represent video color and brightness values, such as in the case of video image data. The pixel values can represent image density values that correspond to exposure detected and transmitted from x-ray emissions. Other pixel representations for other types of visual images will occur to those skilled in the art. In the segmentation process, image structures (regions of interest in the image) are drawn out, or designated, according to known techniques that involve identifying adjacent pixels of similar pixel unit values, or manual operations to designate a structure, and the like.

A mask is formed to provide a filled-in contiguous area that defines one or more closed regions that correspond to structures identified in the visual image. The mask is generally obtained by setting all pixels contained within a segmentation region to the same data value. The mask pixel values are typically either "one" or "zero". The mask then defines an area to which a differential compression rate can be applied. That is, a series of masks can delete selected areas of interest (or no interest) from a copy of the original image to form a series or collection of extracted visual image regions. The collection of visual image regions can be subjected to differential compression and, eventually, can be reconstituted (concatenated) to form a single data file with image information for the entire visual image.

For example, if the MRI image 100 illustrated in FIG. 1 is being used to determine if there is a fracture in the femur, then the data representing the region of the image 102 corresponding to the femur may be compressed at a relatively low rate and the remainder of the image data may be compressed at a relatively high rate. In this example, it may be desired to perform lossless compression of the data representing the femur itself, thereby maintaining its visual fidelity and preserving image details as much as possible, while it may be desired to perform more aggressive, so-called "lossy" compression, on the rest of the image data.

Another example would be where it is desired to examine the relative positions of the femur, tibia, and knee cap. In this example it may be desired to perform lossless compression of the data representing the regions of the image corresponding to the femur 102, tibia 104, and patella 106, and perform lossy compression on the rest of the data file.

In yet another example, it may be desirable to examine the condition of the muscle and the relative position of the femur, tibia, patella. In this example, it may be desired to perform lossless compression to the data representing the region 110 in the image 100 corresponding to the muscle. A higher rate of compression, resulting in lossy compression, may be performed on the data representing the regions in the image corresponding to the femur 102, tibia 104, and patella 108. The lossy compression rate may be selected to maintain an acceptable fidelity in a reconstructed image produced from the compressed data file. The remaining portion of the data may be compressed at an even higher lossy rate of compression because the acceptable fidelity for these regions is not as high. This example shows that multiple rates of compression can be used on the same data file. In this example, the lossless compression rate for the data corresponding to the cartilage maintains its full fidelity. The higher rate of compression for the data corresponding to the femur, tibia, and patella can be selected so that adequate fidelity in the reconstructed image is maintained so that a radiologist can examine their relative positions while reducing the amount of data needed to represent these regions. Also, in this example, the remaining regions are of limited utility to the radiologist and may be compressed at a high rate, further reducing the overall size of the data file representing the entire image.

Compression may be performed at different times, or points, during processing of an image data file, such as when the image is initially captured, or after the original image has been captured. For example, a data file representing an image may be compressed during the process of image capture, such as, when an image such as an x-ray image is initially captured it can be compressed before it is displayed or other processing is done to the image. Likewise, the image initially captured may be displayed, for example, to allow a radiologist to examine it to ensure it is satisfactory, and then the data file representing the image may be compressed. Additionally, the data file representing the initially captured image may be stored with no compression, lossless compression, or lossy compression and then be processed by further compression later. For example, a data file may be stored with no compression, or some compression, and the data file may be further compressed prior to transmission of the data file.

As these examples illustrate, a method of compressing a data file representing an image can be performed by identifying one of more regions within the image, then selecting at least one of the regions and compressing the data file corresponding to the selected regions at a different rate than the compression rate for the data corresponding to non-selected regions of the image. Multiple regions can be selected and each selected region can be compressed at a desired rate, for example, either at the same rate or a different rate from the other selected regions, according to the structures depicted in the regions and according to the relative interest in maintaining image fidelity.

The rate of compression can be selected based on the intended use of the image. The study to be performed may motivate differential compression. For example, if the image 100 in FIG. 1 is being used to determine if there is a hairline fracture in the femur, a lossless compression rate may be used for the data representing the region 102 of the image corresponding to the femur. On the other hand, if the image 100 of FIG. 1 will be used to find the location of a displaced fracture of the femur then a higher, lossy rate of compression may be adequate. If a study of the muscle will be performed, then lossy compression of the femur region may be acceptable.

The rate of compression can be determined either automatically or manually. For example, a radiologist may select desired compression rates for different bounded regions of an image. If desired, a copy of the original data file can be compressed at the selected rates, and then the original file can be reconstructed from the compressed copy. The radiologist can then examine the reconstructed image to decide if it has adequate fidelity and then can adjust the selected compression rates if desired. The stored original image data file remains unchanged.

Figure 2:
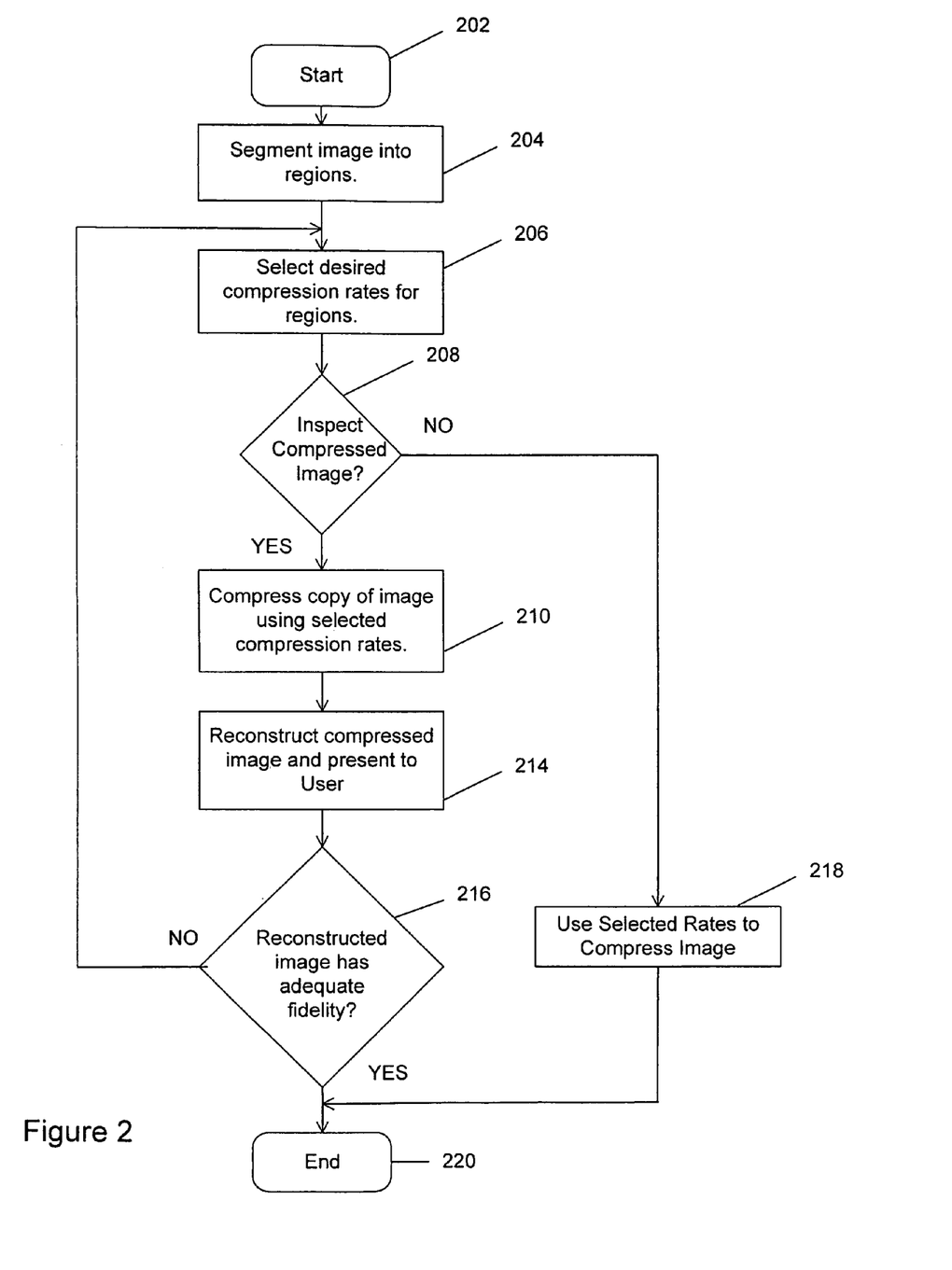
FIG. 2 is a flow chart illustrating an example of manually selecting compression rates.

FIG. 2 is a flow chart illustrating an example of selecting compressing rates for an image system. Flow begins in block 202 where an image is received. Flow continues to block 204 where the received image is segmented into regions. As noted above, the segmenting can be performed manually or it may be performed automatically.

After the image has been segmented, flow continues to block 206. In block 206 compression rates are selected for the regions. For example, if a particular bounded region is of high interest, then a lower rate of compression may be selected for that region, such as a rate that results in lossless compression. On the other hand, if a region is of low interest, then a higher rate of compression may be selected, such as a rate that results in lossy compression. Depending on the type of image that is being compressed, for example an image from an MRI, x-ray, or a CT scan, etc., there may be a default compression rate that will be applied to any portion of the image for which the user does not select a desired compression rate. In this way, the user does not have to select compression rates for all regions of the image, but can just select rates for desired portions of the image and have the remainder of the image compressed at the default rate. After compression rates have been selected, or determined, flow continues to block 208.

In block 208 it is determined if the compressed file is to be inspected, at the user's option. For example, the user may want to examine a reconstruction of the image to ensure that the compression rates selected maintain adequate fidelity in the reconstructed image. On the other hand, the user may not want to inspect the image. If the user does not want to inspect the compressed image, a negative outcome in block 208, then flow continues to block 218 and the selected rates are used to compress the image. Flow then continues to block 220 for further operation.

Returning to block 208, if it is desired to inspect the compressed image, a positive outcome at block 208, then flow continues to block 210. In block 210 the original image is maintained and a compressed data file is produced using the selected rates. Flow continues to block 214 where the data file that was compressed at block 210 is reconstructed and presented to the user. Flow continues to the decision block 216 where the user determines if the reconstructed image is adequate. For example, the user may inspect the reconstructed image to determine if it has sufficient fidelity to be useful in diagnosis. If the reconstructed image is not adequate, a negative outcome in block 216, then flow returns to block 206 and new compression rates are selected.

If it is determined that the reconstructed image is adequate, a positive outcome in block 216, then the compressed image may be sent to a recipient for further study and the original image may be deleted, if desired, and flow continues to block 220.

In another embodiment, the compression rates can be selected automatically. For example, a radiologist can identify the type of image data that will be compressed, such as data from an MRI, x-ray, or a CT scan, etc. The radiologist can then identify other parameters concerning the use of the image. For example, the radiologist may identify that the image is of a knee joint and that he is looking for a subtle fracture in the femur.

Another parameter that may be input by the radiologist is how the compressed image file will be handled. For example, if the compressed data file is going to be stored locally it may be desired to be a particular size to improve storage capabilities. Also, if the compressed data file is going to be transmitted it may be desired to match the compressed file size to the communication channel bandwidth. Likewise, the system may automatically detect parameters, such as storage capacity and communication channel bandwidth and use these detected parameters to adjust the compression rate.

Using these, and perhaps other, inputs the system can examine the image identifying regions and select a desired region, for example, the region that corresponds to the femur. The data file representing the selected region can then be compressed at a desired rate. In this example, because the reconstructed image will be used to evaluate a subtle fracture, a low compression rate may be desired to maintain the fidelity of the reconstructed image. The remaining data may be compressed at a higher rate so that a desired overall size of the compressed data file is achieved.

Figure 3:
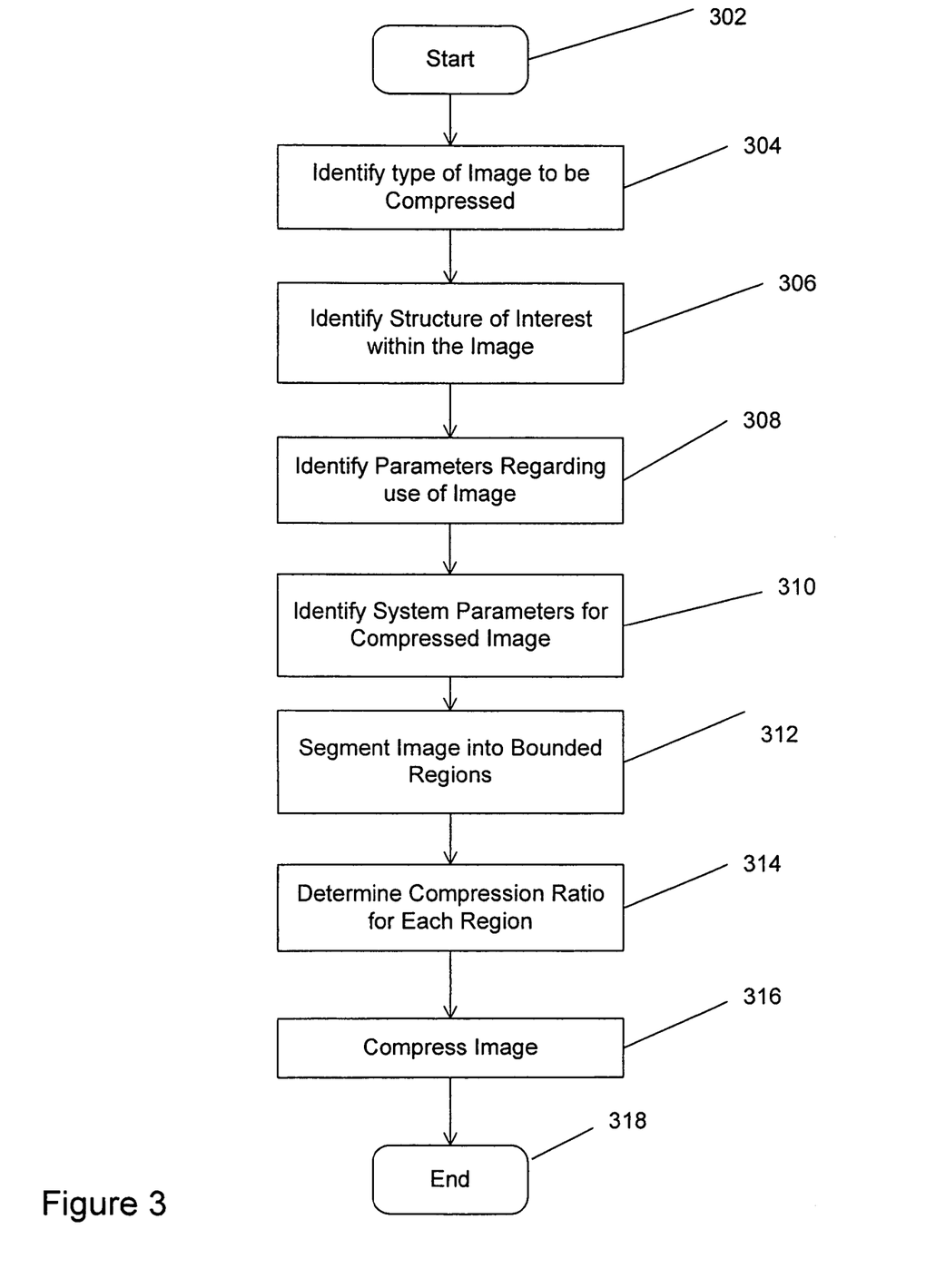
FIG. 3 is a flow chart illustrating an example of automatically selecting compression rates.

FIG. 3 is a flow chart illustrating an example of automatically selecting compression rates. Flow begins in block 302 where an image is received. Flow continues to block 304 where the type of image that is to be compressed is identified. For example, the image to be compressed may be an MRI image, x-ray image, a CT scan image, or other type of image. Flow then continues to block 306.

In block 306 the structure of interest in the image is identified by a user. For example, if the image is an x-ray of the knee area of a patient and there is concern that the patient has a fractured femur, then this information would be provided to the system. The identification of structures of interest can be performed manually through user input, or can be automated as part of system functionality, or may be a combination of the two. For example, a bone might be identified as a structure of interest, either by input to a text box ("bone") of a graphical user interface, or by selection from a drop-down menu, or from examination of an image title or type that then triggers automatic processing (e.g., "bone x-ray"). Associated structures might also be identified, such as associated connective tissues or ligaments, or the like. Operation then continues to block 308.

In block 308 parameters regarding the use of the image are identified. For the example of the fractured femur, the identified use may be for a radiologist to be able to determine the severity of the fracture, such as determining whether it is a subtle fracture or a displaced fracture, whether there is fluid present on the brain, whether tumor growth is indicated, and whether foreign substances are shown. Such use parameters may be entered through text boxes of a suitable user program, or through drop-down menus, and the like. After the parameters regarding the use of the image are identified, operation continues to block 310 of FIG. 3.

In block 310 system parameters for the compressed image are identified. For example, it may be desirable to limit the size of the compressed file depending on the amount of storage available for storing the compressed file, or the bandwidth of the communication channel that the compressed file will be transmitted over, etc. Operation then continues to block 312, where the image is segmented into bounded regions. Using the example of the fractured femur, the image may be segmented into regions as described in FIG. 1. Flow then continues to block 314.

In block 314, using the type of image identified in block 304, the structure identified in block 306, the use parameters identified in block 308, and the system parameters identified in block 310, desired compression ratios for each region are automatically determined by the system. After the desired compression ratios have been determined, flow continues to block 316, where the image file is compressed. For the differential compression, a different number of data bits can be used for representation of pixels in the different segmented regions. For example, in a color video image, each pixel is typically represented by twenty-four (24) data bits, in an uncompressed RBG representation. A black-&-white image (gray scale) is typically represented by eight or 16 bits per pixel. For compression in accordance with the illustrated embodiments, a reduced number of pixels can be specified. For example, in an unselected region of the visual image, the image data might be specified to be represented by four bits per pixel, whereas image data in a selected region of interest might be left uncompressed or each pixel might be represented by a number of bits greater than four bits per pixel. After compression, operation continues at block 318.

The techniques described can be used with various types of data compression algorithms. For example, the techniques can be used with compression algorithms such as Huffman coding, arithmetic coding, JPEG standard coding, and JPEG-2000 standard coding. The techniques described can be used to select different compression rates for data corresponding to selected regions within an image that depicted structures. For example, in JPEG-2000 a first step is to divide an image into rectangular, non-overlapping tiles on a regular grid. The tiles can be grouped so that a bounded region, or structure, within the image corresponds to a group of tiles. Different set of tiles can be grouped corresponding to different regions, or structures, within the image. The different groups of tiles can then be compressed using different compression rates. In other words, a first compression rate can be used for data corresponding to a selected group of tiles and a second compression rate can be used for data corresponding to non-selected regions of the image. The first and second compression rates can be different from each other.

Figure 4:
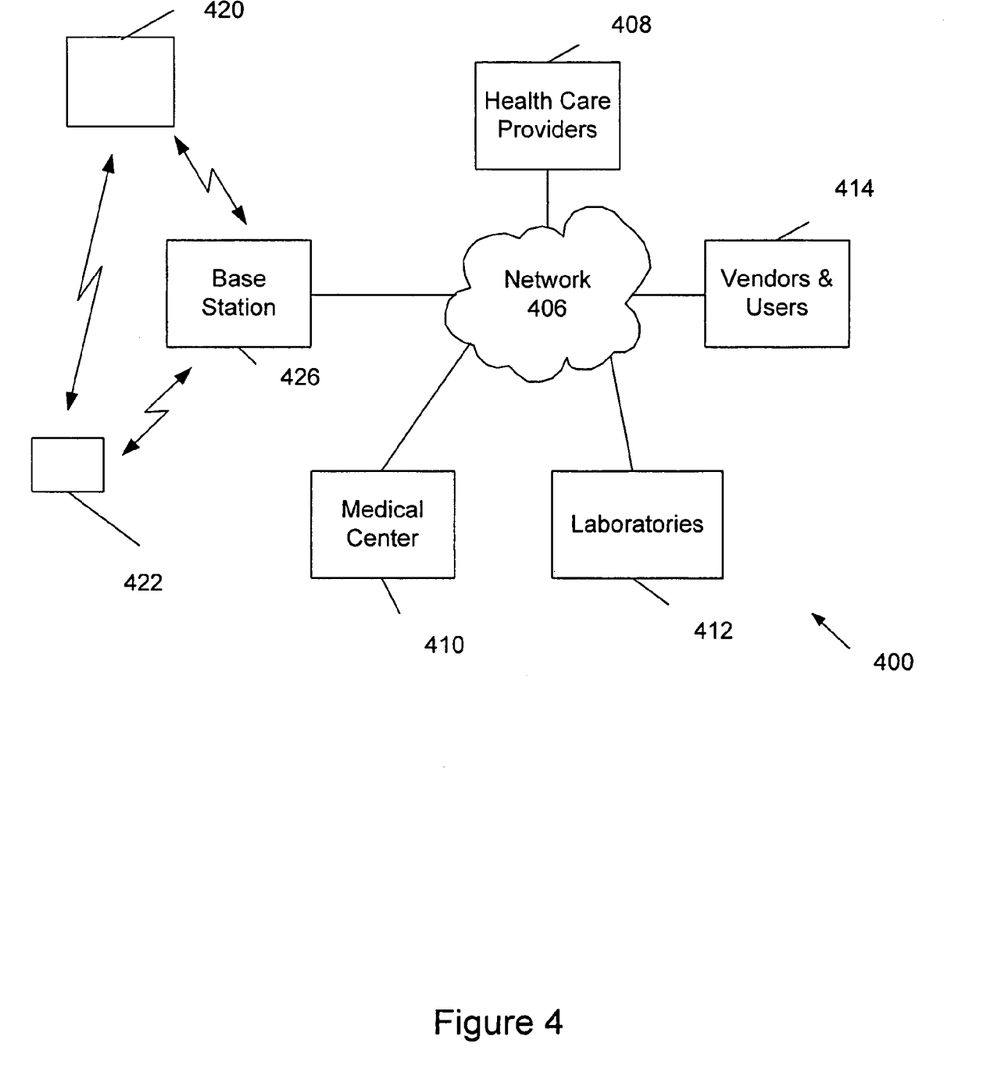
FIG. 4 is a block diagram representation of a data network environment in which digital images can be sent and received over a computer network.

FIG. 4 is a block diagram representation of a data network environment 400 in which digital images can be sent and received over a computer network 406. Communications over the network can occur, for example, according to transport mechanisms such as TCP/IP, or can be received according to network-specific protocols. In the FIG. 4 illustrated embodiment, the image sources can include health care providers 408 such as individual physicians and other allied providers, medical centers 410 such as hospitals and patient care or managed care facilities, laboratories 412 such as medical labs and diagnostic centers, and vendors and users 414, including individual patients, administration services such as management and insurance providers, and other network users who need to communicate images with one of the other network users 408, 410, 412, 414. The network 406 can comprise a local area network (LAN) that interconnects the network nodes 408, 410, 412, 414. The network 406 can include communications over the Internet, or over a combination of local and wide area networks, including intranets and extranets.

As illustrated in FIG. 4, there can also be one or more mobile units 420, 422 that are in wireless communication with a base station 426 that is in communication with the network 406. The mobile units 420, 422 may also communicate directly with each other. The base station 426 can comprise a network access point or an operational work station such as 408-414. In one example, the mobile units could be emergency units, or other first responders, that can be dispatched to an accident or emergency situation. The remote units 420, 422 may include diagnostic equipment, such as x-ray equipment. Upon arriving at an accident or emergency scene, the remote unit may gather diagnostic imagery, compress it using the techniques described and send it over the wireless communication channel to the base station 426 where others connected to the network 406 have access to the image. Because the wireless communication channel will generally have limited bandwidth, this may be taken into consideration when compressing the imagery. Users on the network may also transmit imagery to each other and to the remote unit using the compression techniques described. In addition, remote units may communicate imagery between each other using the compression techniques described. The embodiment of FIG. 4 may also be used in other environments, for example, battlefield environments where remote units 420 may include doctors and field hospitals setup to assist troops during combat or in other hostile environments requiring triage.

Figure 5:
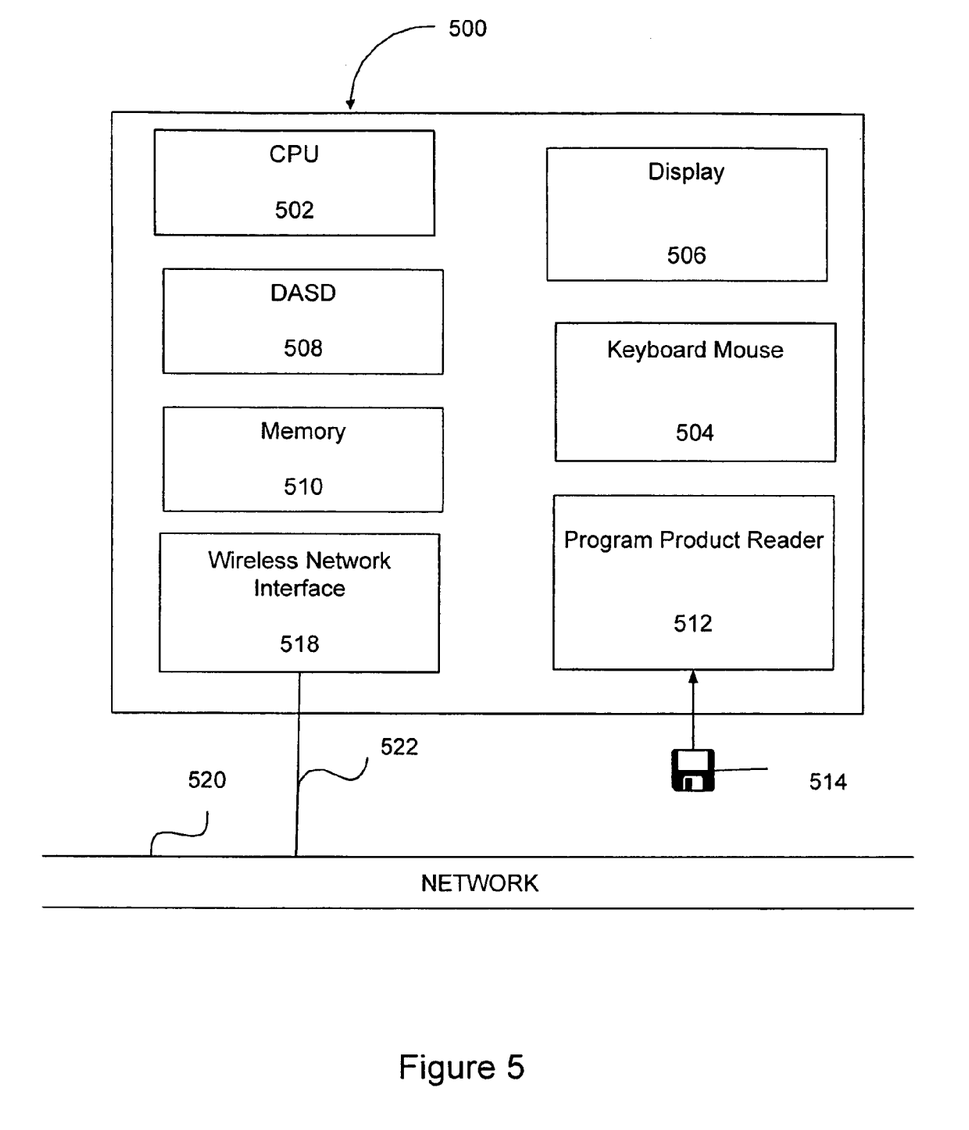
FIG. 5 is a block diagram of an exemplary computer such as might comprise a computer for executing image compression.

FIG. 5 shows an exemplary computer 500 such as might comprise a computer for executing the operations described above. The computer 500 operates in a networked environment that permits communication with other computers. The computer 500 operates under control of a central processor unit (CPU) 502, such as a "Pentium" microprocessor and associated integrated circuit chips, available from Intel Corporation of Santa Clara, Calif., USA. A computer user can input commands and data from a keyboard and computer mouse 504, and can view inputs and computer output at a display 506. The display is typically a video monitor or flat panel display. The computer 500 also typically includes a direct access storage device (DASD) 508, such as a hard disk drive. A memory 510 typically comprises volatile semiconductor random access memory (RAM). Each computer preferably includes a program product reader 512 that accepts a program product storage device 514, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

The computer 500 can communicate with other computers, if networked, over a computer network 520 (such as the Internet or an intranet, or a wireless communication channel) through a network interface 518 that enables communication over a connection 522 between the network 520 and the computer. The network interface 518 typically comprises, for example, a Network Interface Card (NIC) or a modem that permits communications over a variety of networks or a wireless modem.

The CPU 502 operates under control of programming instructions that are temporarily stored in the memory 510 of the computer 500. When the programming instructions are executed, the computer performs its functions. Thus, the programming steps implement the functionality of the system described above. The programming steps can be received from the DASD 508, through the program product storage device 514, or through the network connection 522. The program product storage drive 512 can receive a program product 514, read programming steps recorded thereon, and transfer the programming steps into the memory 510 for execution by the CPU 502. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 510 over the network 520. In the network method, the computer receives data including program steps into the memory 510 through the network interface 518 after network communication has been established over the network connection 522 by well-known methods that will be understood by those skilled in the art without further explanation. The program steps are then executed by the CPU 502 thereby comprising a computer process.

Additional features can be provided through repeated differential compression on multiple related images. For example, a CT scan study of a body area, such as a knee, typically includes a series of images of the body area. In another embodiment, the system can process a first image in a CT scan study to receive a designation of a bounded area selected to be of interest, and then the system can process the subsequent series of images in the CT scan study to "follow" the selected region in the series of images and perform differential compression as described above. In this way, the entire series of CT scan study images will be differentially compressed and will require reduced system resources to transmit, store, and view. Thus, the sequence of operations depicted in the flow chart of FIG. 2 and FIG. 3 can be repeated for each image in a CT scan study (or similar study or grouping of multiple visual images) to provide differential compression of each image. In a similar way, if a group of multiple images forms a 3-dimensional (3-D) representation of a structure, then the 3-D image data can be differentially compressed as described above for each individual image, thereby reducing system requirements for transmission, storage, and viewing of the 3-D representation.

Thus, the invention provides techniques for compressing data files relating to visual images. The compressed data files can be stored as well as routed over data networks, or message systems. The techniques, applicable in a variety of message systems, improve the efficiency and appropriateness of message handling. In accordance with the techniques, bounded regions of a visual image are selected as being of interest and those selected regions are differentially compressed as compared with unselected areas of the image. The selected regions are based on structures or bounded regions that define areas of interest, and such regions can be irregularly shaped and can be located anywhere within the visual image.

The present invention has been described above in terms of a presently preferred embodiment so that an understanding of the present invention can be conveyed. There are, however, many configurations for network message processing not specifically described herein but with which the present invention is applicable. The present invention should therefore not be seen as limited to the particular embodiments described herein, but rather, it should be understood that the present invention has wide applicability with respect to network message processing generally. All modifications, variations, or equivalent arrangements and implementations that are within the scope of the attached claims should therefore be considered within the scope of the invention.

We claim:

1. A method of processing a data file containing data that represents a visual image, the method comprising:
    identifying one or more regions within the visual image that correspond to depicted structures in the visual image;
    selecting at least one of the regions; and
    selecting a first compression rate for data corresponding to the selected regions and selecting a second compression rate for data corresponding to unselected regions of the image, such that the first compression rate is different from the second compression rate, wherein selecting desired compression rates is based upon a type of diagnosis use for a visual image reconstructed from a data file compressed using the compression rates.

2. A method as defined in claim 1, further comprising compressing the data corresponding to the selected regions and unselected regions at their respective compression rates.

3. A method as defined in claim 2, further comprising reconstructing the compressed data file after data compression and examining the reconstructed visual image to determine if it has adequate fidelity.

4. A method as defined in claim 3, wherein if it is determined that the reconstructed visual image does not have adequate fidelity, then selecting a third compression rate for data corresponding to the selected regions, such that the third compression rate is different from the first compression rate.

5. A method as defined in claim 1, wherein the one or more regions correspond to anatomical structures of the visual image.

6. A method as defined in claim 1, wherein the data file is an magnetic resonance imaging (MRI) data file, an x-ray data file, or a computer tomography (CT Scan) data file.

7. A method as defined in claim 1, wherein the first and second compression rates are predetermined.

8. A method as defined in claim 1, wherein at least one of the compression rates are selected by a user.

9. A method as defined in claim 1, wherein identifying one or more regions comprises using a mask.

10. A method as defined in claim 1, wherein the first and second compression rates are determined in response to an available bandwidth of a communication channel used to transmit the compressed data file.

11. A method as defined in claim 10, wherein the determination is automatic.

12. A method as defined in claim 1, wherein the first and second compression rates are determined in response to an available capacity of a storage media used to store a data file compressed using the compression rates.

13. A method as defined in claim 12, wherein the determination is automatic.

14. A method as defined in claim 1, wherein the first and second compression rates are determined automatically.

15. A method as defined in claim 1, wherein selecting desired compression rates is based upon system parameters.

16. A method as defined in claim 1, further comprising compressing the data corresponding to the selected regions and unselected regions at their respective compression rates and repeating such processing for each of a series of visual scan images comprising a scan study.

17. A computer processing apparatus for processing a data file representing an image, the apparatus comprising:
    a network communications interface that permits communications between the apparatus and a network; and
    a processor that receives the data file representing an image and identifies one or more regions within the image corresponding to depicted structures, selects at least one of the regions, and selects a first compression rate for data corresponding to the selected region and a second compression rate for data corresponding to non-selected regions of the image, the first compression rate being different from the second compression rate, wherein the processor selects the compression rates based upon a type of diagnosis use for an image reconstructed from a data file compressed using the compression rates.

18. An apparatus as defined in claim 17, further comprising compressing the data corresponding to the selected and non-selected regions at their respective compression rates.

19. An apparatus as defined in claim 17, wherein the one or more regions correspond to anatomical structures.

20. An apparatus as defined in claim 17, wherein the data file is an MRI data file, an x-ray data file, or a CT Scan data file.

21. An apparatus as defined in claim 17, wherein the different compression rates are predetermined.

22. An apparatus as defined in claim 17, wherein identifying one or more regions comprises using a mask.

23. An apparatus as defined in claim 17, wherein the different compression rates are determined in response to an available bandwidth of a communication channel used to transmit a data file compressed using the compression rates.

24. An apparatus as defined in claim 17, wherein the different compression rates are determined in response to an available capacity of a storage media used to store a data file compressed using the compression rates.

25. An apparatus as defined in claim 17, wherein the different compression rates are determined automatically.

26. An apparatus as defined in claim 17, wherein the apparatus compresses the data corresponding to the selected regions and unselected regions at their respective compression rates and repeats such processing for each of a series of visual scan images comprising a scan study.

27. A program product for use in a wireless communication system that executes program instructions recorded in a computer-readable media to perform a method of configuring a mode of operation of a destination communication device, the program product comprising:
    a recordable media; and
    a plurality of computer-readable instructions executable by a processing device to perform a method comprising
        identifying one of more regions within the image corresponding to depicted structures;
        selecting at least one of the regions; and
        selecting a first compression rate for data corresponding to the selected regions and a second compression rate for data corresponding to non selected regions of the image, the first compression rate being different from the second compression rate, wherein the compression rates are based upon a type of diagnosis use for an image reconstructed from a data file compressed using the compression rates.

28. A program product as defined in claim 27, further comprising compressing the selected regions and non-selected regions at their respective compression rates.

29. A program product as defined in claim 27, wherein the compression rates are based upon a system parameter.

30. A program product as defined in claim 29, wherein the system parameter comprises a bandwidth of a communication channel used to transmit a data file compressed using the selected compression rates.

31. A program product as defined in claim 29, wherein the system parameter comprises a capacity of a storage media used to store a data file compressed using the selected compression rates.

32. A program product as defined in claim 27, wherein compressing comprises compressing the data corresponding to the selected regions and unselected regions at their respective compression rates and repeating such processing for each of a series of visual scan images comprising a scan study.

33. A method of processing a data file containing data that represents a visual image, the method comprising:

identifying one or more regions within the visual image that correspond to depicted structures in the visual image; selecting at least one of the regions;

selecting a first compression rate for data corresponding to the selected regions and selecting a second compression rate for data corresponding to unselected regions of the image, such that the first compression rate is different from the second compression rate;

compressing the data corresponding to the selected regions and unselected regions at their respective compression rates;

reconstructing the compressed data file after data compression and examining the reconstructed visual image to determine if it has adequate fidelity; and wherein if it is determined that the reconstructed visual image does not have adequate fidelity, then selecting a third compression rate for data corresponding to the selected regions, such that the third compression rate is different from the first compression rate.

* * * * *